United States Patent
Gannon et al.

(10) Patent No.: US 12,226,712 B2
(45) Date of Patent: Feb. 18, 2025

(54) SUMP PUMP SYSTEM AND METHODS FOR REMOVING SYNTHETIC ESTER-BASED FLUIDS FROM AN EMULSION

(71) Applicant: Solidification Products International, Inc., Northford, CT (US)

(72) Inventors: William J. Gannon, Northford, CT (US); David Tomlinson, Cheshire, CT (US); Paul Melaccio, Clinton, CT (US)

(73) Assignee: Solidification Products International, INC., Northford, CT (US)

( * ) Notice: Subject to any disclaimer, the term of this patent is extended or adjusted under 35 U.S.C. 154(b) by 170 days.

(21) Appl. No.: 17/490,781

(22) Filed: Sep. 30, 2021

(65) Prior Publication Data
US 2022/0096963 A1  Mar. 31, 2022

Related U.S. Application Data (60) Provisional application No. 63/085,673, filed on Sep. 30, 2020.

(51) Int. Cl.
  *B01D 17/04*  (2006.01)
  *B01D 17/02*  (2006.01)
  (Continued)

(52) U.S. Cl.
  CPC ....... *B01D 17/045* (2013.01); *B01D 17/0202* (2013.01); *C02F 1/28* (2013.01);
  (Continued)

(58) Field of Classification Search
  CPC ...... B01D 17/045; B01D 17/04; B01D 17/02; B01D 17/0202; C02F 1/28; C02F 1/40;
  (Continued)

(56) References Cited

U.S. PATENT DOCUMENTS 2,324,763 A * 7/1943 Eben ................ F16N 39/06
                                              184/6.24
3,876,544 A   4/1975 Fowler
(Continued)

FOREIGN PATENT DOCUMENTS

CA       2560344 C  *  4/2009  ......... B01D 17/0202

OTHER PUBLICATIONS

Synthetic Ester Transformer Fluids; Electrical & Power Review Magazine; Feb. 10, 2019; 1 page (Year: 2019).*
(Continued)

*Primary Examiner* — Robert J Popovics
(74) *Attorney, Agent, or Firm* — DeLio Peterson & Curcio LLC; Robert Curcio (57) ABSTRACT

A polishing filter apparatus employed within a sump pump system for removing mineral oils, natural ester, and synthetic ester-based fluids from an emulsion is provided. The polishing filter apparatus is connected to a sump pump barrier via a polishing filter inlet conduit. Further conduit structures are disposed within the polishing filter apparatus, which lead into a polishing filter cartridge. The polishing filter removes excess synthetic ester-based fluids from a water/oil emulsion fluid flowing therethrough and releases a resultant filtered fluid. The polishing filter cartridge contains a filtration media with a hydrophilic composition for the capture of synthetic ester-based fluid having a surface tension dissimilar to water, and the hydrophilic composition of the media has a surface energy greater than or equal to 35 dynes per centimeter.

9 Claims, 7 Drawing Sheets

(51) Int. Cl.
*C02F 1/28* (2023.01)
*C02F 1/40* (2023.01)
*C02F 101/32* (2006.01)
*C02F 103/00* (2006.01)

(52) U.S. Cl.
CPC ............ *C02F 1/40* (2013.01); *C02F 2101/32* (2013.01); *C02F 2103/001* (2013.01); *C02F 2201/005* (2013.01); *C02F 2201/006* (2013.01)

(58) Field of Classification Search
CPC ............ C02F 2101/32; C02F 2103/001; C02F 2201/005; C02F 2201/006
See application file for complete search history.

(56) References Cited

U.S. PATENT DOCUMENTS

| | | | |
|---|---|---|---|
| 4,058,463 A | 11/1977 | Bartik | |
| 4,655,927 A | 4/1987 | Ford | |
| 5,965,015 A * | 10/1999 | Ronan | B01D 17/045 210/DIG. 5 |
| 6,010,621 A * | 1/2000 | Pattee | B01D 17/0211 210/114 |
| 6,485,639 B1 * | 11/2002 | Gannon | B01J 20/261 210/170.03 |
| 6,503,390 B1 | 1/2003 | Gannon | |
| 8,974,662 B2 | 3/2015 | Gannon | |
| 9,646,735 B2 | 5/2017 | Adamson et al. | |
| 2002/0027106 A1 * | 3/2002 | Smith | B01D 29/52 210/691 |
| 2009/0178970 A1 | 7/2009 | Stanfel et al. | |
| 2011/0247970 A1 * | 10/2011 | Evingham | B01D 29/52 210/85 |
| 2012/0103914 A1 | 5/2012 | Yuan | |
| 2012/0325734 A1 * | 12/2012 | Gannon | B01D 17/10 210/282 |
| 2013/0212932 A1 * | 8/2013 | Bell | C10L 1/026 44/388 |
| 2016/0122686 A1 | 5/2016 | Dietz | |
| 2016/0281007 A1 | 9/2016 | Reams et al. | |
| 2019/0226193 A1 * | 7/2019 | Deurloo | E03F 5/0404 |
| 2020/0206667 A1 * | 7/2020 | Gannon | B01J 20/267 |
| 2021/0322902 A1 * | 10/2021 | Gannon | B01D 35/02 |
| 2022/0032214 A1 * | 2/2022 | Morris | B01D 39/1623 |

OTHER PUBLICATIONS

Comparatively Speaking: Lowering Surface Tension in Water vs. Oil; Aug. 3, 2010; Anthony J. O'Lenick Jr., Siltech; 1 page. (Year: 2010).*

* cited by examiner

| Test No. | Oil and Grease Result (mg/L) | Dilution |
|---|---|---|
| Test 1 | < 1.6 | 1.1 |
| Test 2 | 5.8 | 1.1 |
| Test 3 | 440,000 | 8 |
| Test 4 | 880,000 | 1 |
| Test 5 | 9.3 | 1.1 |
| Test 6 | 21 | 1.1 |
| Test 7 | 16 | 1.1 |
| Test 8 | 20 | 1.1 |
| Test 9 | 18 | 1.1 |
| Test 10 | 12 | 1.1 |
| Test 11 | 14 | 1.1 |
| Test 12 | 18 | 1.1 |
| Test 13 | 17 | 1.1 |
| Test 14 | 14 | 1.1 |
| Test 15 | 15 | 1.1 |
| Test 16 | 18 | 1.1 |
| Test 17 | 18 | 1.1 |
| Test 18 | 14 | 1.1 |
| Test 19 | 16 | 1.2 |
| Test 20 | <1.6 | 1.1 |
| Test 21 | 1.6 | 1.1 |
| Test 22 | 43,000 | 8 |
| Test 23 | 12 | 1.1 |
| Test 24 | 15 | 1.1 |
| Test 25 | 16 | 1.1 |

| Test No. | Oil and Grease Result (mg/L) | Dilution |
|---|---|---|
| Test 1 | 2.5 | 1.4 |
| Test 2 | 2.1 | 1.3 |
| Test 3 | 2.2 | 1.3 |
| Test 4 | 2.1 | 1.3 |
| Test 5 | 2.4 | 1.3 |
| Test 6 | 3.2 | 1.3 |
| Test 7 | 3.7 | 1.3 |
| Test 8 | 3.5 | 1.3 |
| Test 9 | 3.5 | 1.3 |
| Test 10 | 3.9 | 1.2 |
| Test 11 | 2.7 | 1.2 |
| Test 12 | 3.1 | 1.3 |
| Test 13 | 4.3 | 1.3 |

FIG. 7

| Dynes/cm | METALS |
|---|---|
| 1103 | Copper |
| 840 | Aluminum |
| 753 | Zinc |
| 526 | Tin |
| 458 | Lead |
| 700-1100 | Stainless Steel |
| 250-500 | Glass |

| Dynes/cm | |
|---|---|
| 37 | PVA |
| 36 | Polystyrene |
| 36 | Acetal |
| 33 | EVA |
| 31 | Polyethylene |
| 29 | Polypropylene |
| 28 | Tedlar® |
| 18 | Teflon® |

| Dynes/cm | PLASTICS |
|---|---|
| 50 | Kapton® (Polymide) |
| 47 | Phenolic |
| 46 | Nylon |
| 45 | Alkyd Enamel |
| 43 | Polyester |
| 43 | Epoxy Paint |
| 43 | Polyurethane Paint |
| 42 | ABS |
| 42 | Polycarbonate |
| 39 | PVC (Polyvinyl Chloride) |
| 38 | Noryl® |
| 38 | Acrylic |
| 38 | Polane® Paint |

FIG. 8

Molecular Weight, Density, Surface Tension, and Viscosity for Selected Liquids

| Name | Molecular Formula | Mol. Wt. | Specific Density | Surface Tension | Viscosity cP | Viscosity cs |
|---|---|---|---|---|---|---|
| Acetic acid (ethanoic acid) | C2H4O2 | 60.05 | 1.043 | 27 | 1.06 | 1.02 |
| Acetone (propanone) | C3H6O | 58.08 | 0.788 | 23 | 0.31 | 0.39 |
| Benzene | C6H6 | 78.11 | 0.873 | 28.2 | 0.6 | 0.69 |
| Cyclohexane | C6H12 | 84.16 | 0.773 | 24.7 | 0.89 | 1.15 |
| Dichloromethane (methylene chloride, DCM) | CH2Cl2 | 84.93 | 1.318 | 27.8 | 0.41 | 0.31 |
| Ethanol (ethyl alcohol) | C2H6O | 46.07 | 0.787 | 22 | 1.07 | 1.36 |
| Ethylene glycol | C2H6O2 | 62.07 | 1.111 | 48.4 | 16.1 | 14.5 |
| Formamide (methanomide) | CH3NO | 45.04 | 1.129 | 57 | 3.34 | 2.96 |
| Glycerol | C3H8O3 | 92.09 | 1.257 | 76.2 | 934 | 743 |
| Hydrogen peroxide | H2O2 | 34.02 | 1.449 | 74 | 1.25 | 0.86 |
| Mercury | Hg | 200.59 | 13.63 | 474.4 | 1.53 | 0.11 |
| Methanol (methyl alcohol) | CH4O | 32.04 | 0.787 | 22.1 | 0.54 | 0.69 |
| Nitromethane | CH3NO2 | 61.04 | 1.129 | 36.3 | 0.63 | 0.56 |
| Toluene | C7H8 | 92.14 | 0.865 | 27.9 | 0.56 | 0.65 |
| 1,1,1-Trichloroethane (methyl chloroform) | C2H3Cl3 | 133.4 | 1.33 | 25 | 0.79 | 0.59 |
| Trichloroethylene (TCE, trichloroethene) | C2HCl3 | 131.39 | 1.458 | 28.7 | 0.55 | 0.38 |
| Trichloromethane (chloroform) | CHCl3 | 119.38 | 1.48 | 26.7 | 0.54 | 0.36 |
| Water | H2O | 18.02 | 0.999 | 72.7 | 0.89 | 0.89 |

FIG. 9

| Test No. | Oil and Grease Result (mg/L) | Dilution |
|---|---|---|
| Test 1 | 1.4 | 1 |
| Test 2 | < 1.4 | 1 |
| Test 3 | < 1.5 | 1 |
| Test 4 | < 1.4 | 1 |
| Test 5 | < 1.4 | 1 |
| Test 6 | 1.4 | 1 |
| Test 7 | 1.6 | 1 |
| Test 8 | 2.1 | 1 |
| Test 9 | 1.9 | 1 |
| Test 10 | 1.5 | 1 |
| Test 11 | < 1.4 | 1 |
| Test 12 | 1.4 | 1 |
| Test 13 | 1.9 | 1 |
| Test 14 | 1.6 | 1 |
| Test 15 | < 1.4 | 1 |
| Test 16 | < 1.4 | 1 |
| Test 17 | 1.6 | 1 |

FIG. 10

SUMP PUMP SYSTEM AND METHODS FOR REMOVING SYNTHETIC ESTER-BASED FLUIDS FROM AN EMULSION

BACKGROUND OF THE INVENTION

1. Field of the Invention

The present invention relates to filtration media for use in removing and/or solidifying synthetic ester-based fluids from liquids, such that the resultant liquids may be free from such oils and solvents after filtering. More specifically, the present invention relates to a sump pump system meant for separating synthetic ester-based fluids from a liquid emulsion, such as an oil-water emulsion.

2. Description of Related Art

Today's escalation in power demands pushes oft-aging power grid networks to their limits, causing unprecedentedly high failure rates in their technologies, such as catastrophic failures in large power transformers. In these situations, mineral-oil-based dielectric insulating fluids have demonstrated costly limitations. For instance, mineral-oil-filled transformer explosions and fires causing heavy collateral damage have raised major safety concerns. There have also been major environmental concerns over the toxic effects of uncontained mineral oil spills. This has given rise to a new class of alternative dielectric insulating fluids (ester oils) that have historically been developed to answer these specific concerns, but present unique problems of their own.

In order to prevent contamination of the environment by oils and solvents, in many commercial and industrial applications and installations, spill containment systems are built that not only trap the potential spilled liquids but also any process liquid or rain/snow-melt liquid that comes in contact with the spill containment area. Federal, State, and local regulations that mandate spill protection to minimize or eliminate contaminated discharges to the environment require engagement at the spill site, such as the implementation of containment and filtration methods and systems.

One such example of a spill containment and filtration system is Solidification Products, International, Inc.'s Pump-Thru Barrier™, identified as U.S. Pat. No. 8,974,662 issued to Gannon on Mar. 10, 2015, titled "FILTRATION OF A PUMPED HYDROCARBON CONTAINING LIQUID", which teaches an apparatus for, and method of, filtering hydrocarbon contaminated water, and which may be used in drainage openings, particularly in parking lots, and contaminant areas for large sources of hydrocarbons, such as oil tanks or electrical transformers. The Pump-Thru Barrier™ automatically activates as fluid flow and levels within the containment area build up. An automated sump pump having a shutoff valve disposed thereon leads fluid into the sump pump barrier, the fluid typically comprises, for example, a combination of water and oil. An outlet conduit is disposed near the bottom of the sump pump barrier for egressing water, and an overflow conduit disposed near the top of the sump pump barrier recycles overflowing water and oil/sheen mix back into the containment area. Disposed within the sump pump barrier between the automated sump pump/overflow conduit and outlet conduit is a filter media housing, which contains a hydrocarbon absorption media capable of absorbing/adsorbing hydrocarbons/sheen present in water, while simultaneously allowing water to pass through. Such hydrocarbon media is identified in U.S. Pat. No. 6,503,390 issued to Gannon on Jan. 7, 2003, titled "FILTRATION OF HYDROCARBON CONTAINING LIQUID".

Thus, oil/sheen leaks occurring within a containment area that begin to overflow due to excess water buildup create an emulsion that gets introduced into the sump pump barrier via the automated sump pump. The sump pump barrier will take in the emulsion, separating the water and allowing it to egress through the outlet conduit, while the hydrocarbon absorption filter media disposed within the filter media housing absorbs/adsorbs the oil/sheen. Eventually, the filter media will prevent any further liquids from passing through the sump pump barrier due to a complete absorption/adsorption of sheen and resultant solidification of the filter media, and will thus recycle the remaining overflowing emulsion back into the containment area so as to prevent any oils/sheen from leaving the site. Only clean, filtered water is able to pass through the sump pump barrier and escape the containment area.

Present day power plants use natural and/or synthetic ester-based fluids to greatly improve electrical performance and cooling capabilities in their transformers. Ester-based fluids may also be used as lubricants, and as hydraulic fluids. The use of natural esters (which are typically oil based) at these plants presents the possibility of fluid spills occurring on-site, which creates a risk of environmental contamination. Natural esters may also be flammable or present poor biodegradable properties, among other issues. Synthetic ester-based fluids have thus been created in response to the issues commonly caused by the use of natural esters.

Synthetic based ester oil is oil that has been chemically synthesized. Typically, synthetic ester-based fluids are used in such applications as passenger car air-conditioning compressors, refrigerators, and transformers, and in other industrial applications. Synthetic esters are prized for their ability to lubricate at high temperatures. One of the main reasons for this is that they have a much lower volatility than other lubricant based oils at a given viscosity. Volatility is strongly related to smoke point, flash point, and fire point. Ester oils are generally utilized as a replacement for mineral oil in distribution and power class transformers.

Although these synthetic ester-based fluids are deemed to be non-hazardous and biodegradable, a formulation can include hundreds of additives, which address performance issues specific to their application and performance shortcomings of the base oil. Additives are commonly used to address oxidative aging, corrosion, high pressure, low or high temperature conditions, phase transition, shear, foaming, and hydrolysis (particularly for vegetable and synthetic ester-based oils). Consequently, the need exists for total synthetic ester-based fluid containment technology in the event that a failure occurs which requires immediate containment.

Generally, graphene has been utilized as a filler for composite materials due in part to its intrinsic mechanical, thermal, and electrical properties. For example, graphene's lack of solubility in substantially all solvents has led to the common practice of either using graphene oxide or reduced graphene oxide in lieu of pristine graphene sheets.

In U.S. Pat. No. 9,646,735 issued to Adamson, et al. on May 9, 2017, titled "GRAPHENE/GRAPHITE POLYMER COMPOSITE FOAM DERIVED FROM EMULSIONS STABILIZED BY GRAPHENE/GRAPHITE KINETIC TRAPPING" (the "'735 Patent") the graphene/graphite stabilized composite disclosed was tested for use in the sump pump barrier (e.g., graphene/graphite stabilized emulsion-templated foam composite), and has been used to make foam composites that have shown bulk conductivities up to about 2 S/m, as well as compressive moduli up to about 100 MPa and breaking strengths of over 1200 psi with densities as low as about 0.25 g/m$^3$.

The aforementioned graphene/graphite material may be formed as an adsorption/absorption media to achieve desirable results when exposed to mineral oils or natural ester oils. However, the behavior with certain synthetic ester oils is inadequate, especially when emulsified with water due to a very similar density and a very similar polarity to water, as opposed to mineral oils.

Figure 1:
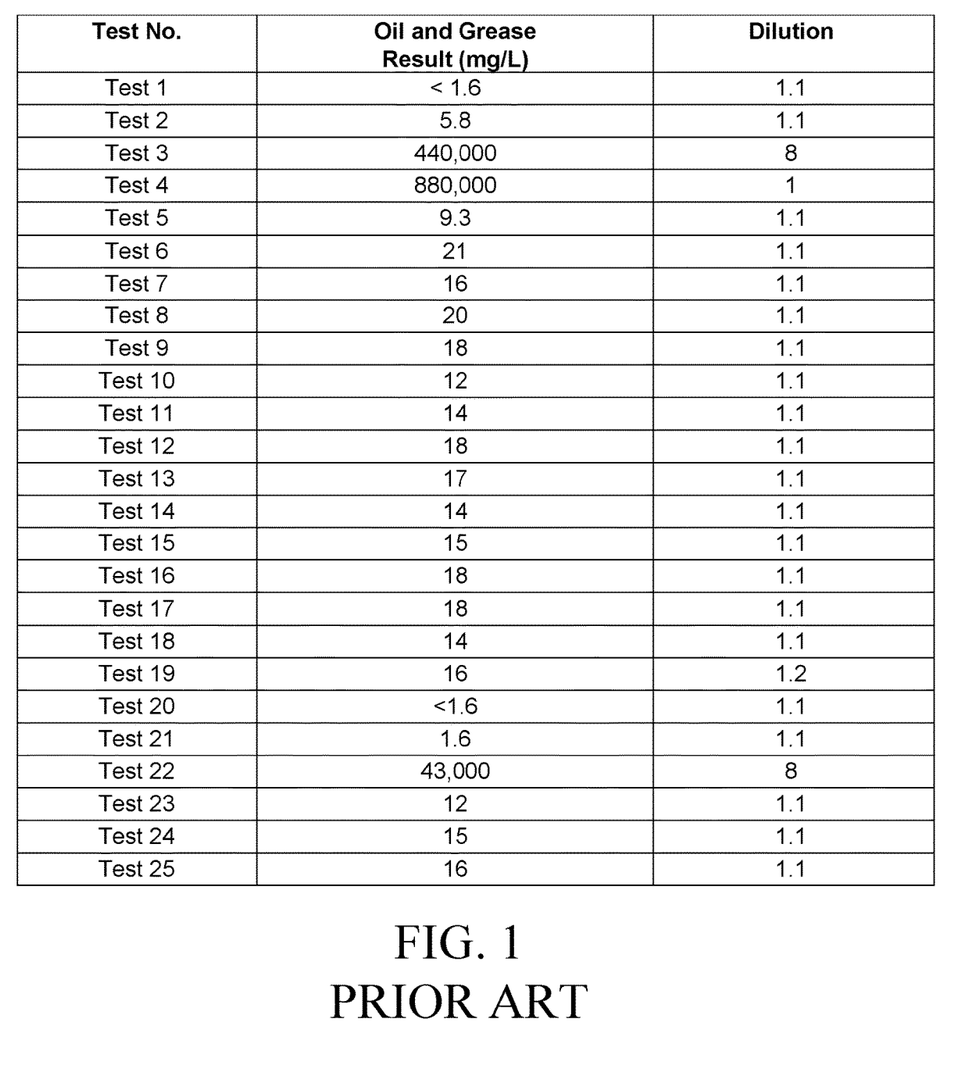
FIG. 1 is a table of prior art laboratory results showing occasional inconsistent measurements of over 20 parts per million of synthetic ester-based fluid in a tested post-filtered water, the tested water being filtered by the prior art, sump pump barrier described herein.
Figure 2:
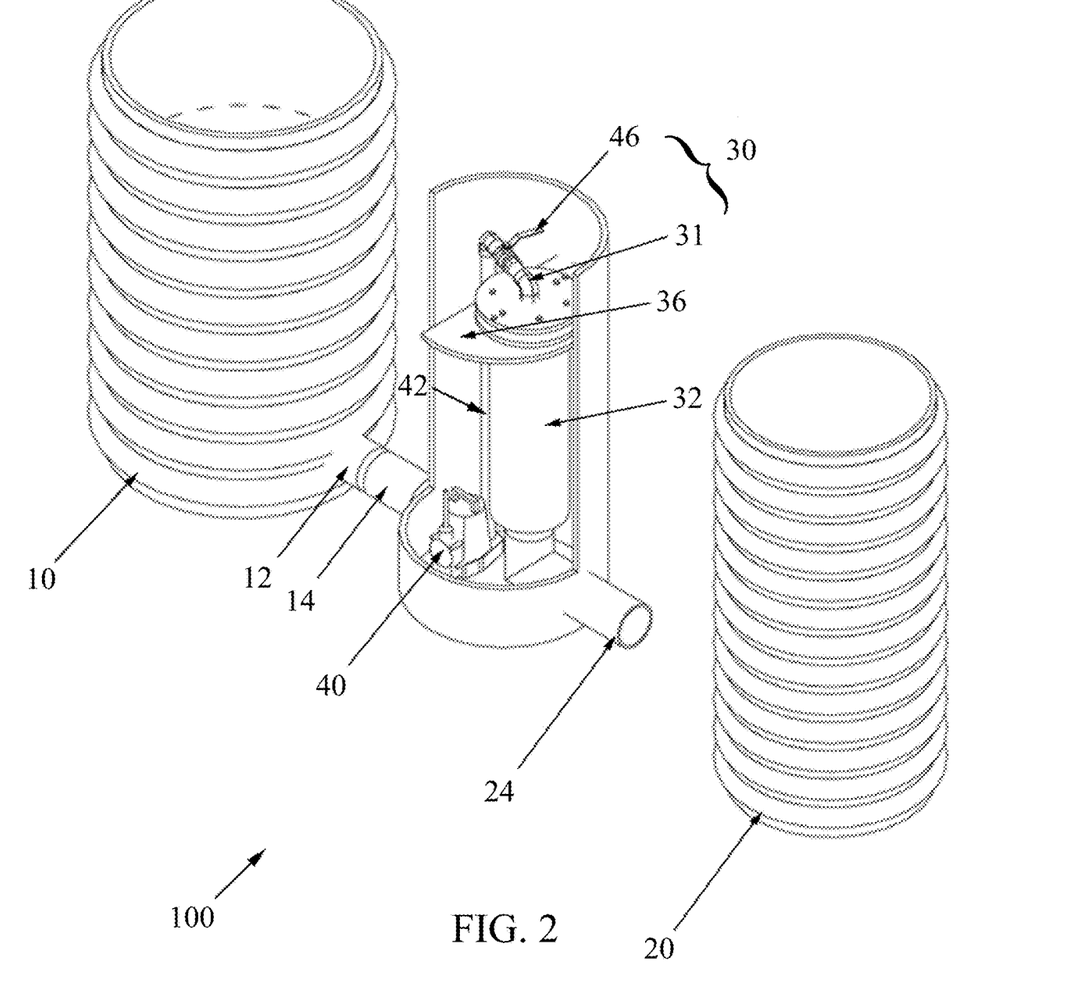
FIG. 2 is a perspective, partially exploded view of a sump pump system of the present invention with the polishing filter barrier separated from the polishing filter housing.

Thus, although the graphene/graphite polymer composite foam of the '735 Patent described above is promising for potential application to natural esters, there are limitations and unique challenges to the application of this composite for applications requiring the containment of synthetic ester-based fluids. The United States Environmental Protection Agency (the "EPA") requires the discharge of water containing oil (including natural ester-based and synthetic ester-based fluids) from power plants to be below 15 parts per million ("ppm"), which is tested utilizing EPA test method 1664A. The inability of this graphene/graphite polymer composite to filter/remove effectively synthetic ester-based fluids from emulsions was confirmed through a series of lab tests conducting EPA test method 1664A, such test results provided in prior art FIG. 1.

Problems regarding the installation and structure of filtration assemblies, and their ability to handle certain flows/volumes of fluid while properly filtering synthetic oils are present in the prior art. For example, the aforementioned sump pump barrier utilizing the hydrocarbon absorption media works well in handling and filtering high flow/volumes of water and sheen emulsions, but is less effective when the emulsion introduced into the sump pump barrier is comprised of synthetic ester-based fluids. Furthermore, the graphene/graphite polymer composite foam of the prior art cannot effectively absorb these synthetic ester-based fluids when paired to work with the sump pump barrier either as a replacement filtration media (for the hydrocarbon absorption media) or as a polishing filter media.

SUMMARY OF THE INVENTION

Bearing in mind the problems and deficiencies of the prior art, it is therefore an object of the present invention to provide a sump pump barrier and polishing filter apparatus that allows for a steady flow rate of water and sealing in the presence of an overloaded supply of synthetic ester-based fluid and water emulsions.

It is another object of the present invention to provide a method of filtering/sealing synthetic ester-based fluids from an emulsion.

A further object of the invention is to provide a sump pump system for receiving an emulsion that filters synthetic ester fluids from water or other liquids.

Yet another object of the invention is to provide a new permutation/formulation of media effective against all oils, including mineral, natural, and/or synthetic esters.

Still other objects and advantages of the invention will in part be obvious and will in part be apparent from the specification.

The above and other objects, which will be apparent to those skilled in the art, are achieved in the present invention which is directed to a sump pump system for the filtration of synthetic ester-based fluids from an emulsion. The system comprises a sump pump barrier having an outlet conduit for the flow of fluid therethrough. A polishing filter apparatus includes a polishing filter disposed in a polishing filter barrier, having a polishing filter inlet conduit fluidly connected to the sump pump barrier outlet conduit for the ingress of the fluid into the polishing filter, and a polishing filter outlet conduit for the egress of a filtered fluid. Said polishing filter is disposed within the polishing filter barrier of said polishing filter apparatus, and is connected to the polishing filter conduit. The polishing filter has a polishing filter cartridge disposed therein, the cartridge which contains a hydrophilic composition for the removal of synthetic ester-based fluid having a surface tension dissimilar to water, and further having a surface energy greater than or equal to 35 dynes per centimeter. The fluid flows through the sump pump barrier and into the polishing filter barrier via the sump pump barrier outlet conduit and polishing filter inlet conduit, and is pumped into the polishing filter. It is then filtered via the polishing filtered cartridge within the polishing filter housing, and the resultant filtered fluid exiting the polishing filter barrier via the polishing filter barrier outlet conduit contains less than 5 ppm of said synthetic ester-based fluids.

In an embodiment, the composition contained within the filter cartridge may include polyether sulfone or a glass fiber media. The composition contained within the filter cartridge may be a filter media having a surface energy greater than or equal to 45 dynes per centimeter. The system may further include a shutoff valve disposed on one of the pump conduit and polishing filter conduit, the shutoff valve being interactive to open/close the flow of fluids through said pump conduit and polishing filter conduit.

In a further embodiment, the sump pump system may further include a polishing filter barrier cover for disposal over the top surface of the polishing filter barrier. A shutoff valve access hole may be carved into the polishing filter barrier cover for providing access to a shutoff valve disposed within the polishing filter barrier and disposed on one of the pump conduit and polishing filter conduit. A power cord access hole may be carved into the polishing filter barrier cover for allowing a power cord to lead into the polishing filter barrier and connect to the pump, supplying the pump with power. The sump pump system may further include a pump disposed within the polishing filter apparatus and connected to a pump conduit, the pump conduit further connected to said polishing filter.

The present invention is further directed to a method of filtering synthetic ester-based fluids from an emulsion. The method comprises the steps of: providing a sump pump barrier for receiving an emulsified fluid comprising water and synthetic ester-based fluid, wherein surface tension of the synthetic ester-based fluid is dissimilar to surface tension of said water, the sump pump barrier having an outlet conduit for the flow of the emulsified fluid therethrough; flowing the emulsified fluid through the sump pump barrier outlet conduit into a polishing filter apparatus via a polishing filter inlet conduit; pumping the emulsified fluid through a pump and a connecting polishing filter inlet conduit, the polishing filter inlet conduit further leading into a polishing filter, all of which are disposed within the polishing filter apparatus; filtering said synthetic ester-based fluid from the emulsified fluid flowing through the polishing filter inlet conduit into the polishing filter via a polishing filter cartridge disposed within said polishing filter of the polishing filter apparatus, the polishing filter cartridge containing a hydrophilic composition having a surface energy greater than or equal to 35 dynes per centimeter for the capture of the synthetic-ester based fluid resulting in a filtered fluid via the filtration of the emulsified fluid by the polishing filter cartridge; and egressing the filtered fluid from the polishing filter apparatus via a polishing filter outlet conduit.

In an embodiment, the composition contained within the filter cartridge hydrophilic composition may include polyether sulfone or a glass fiber media. The surface energy of the hydrophilic composition contained within the filter cartridge may be greater than or equal to 45 dynes per centimeter.

The present invention is still further directed to a polishing filter apparatus for the filtration of synthetic ester-based fluids from an emulsion. The polishing filter apparatus comprises a polishing filter, a polishing filter barrier, and an inlet conduit for receiving a flow of a fluid, said fluid comprising a synthetic ester based fluid and water emulsion, wherein the synthetic ester based fluid has a surface tension dissimilar to that of the water, and an outlet conduit for the egress of a resultant filtered fluid. A pump is disposed within the polishing filter barrier for pumping the fluid through a pump conduit. The polishing filter is disposed within the polishing filter apparatus and is fluidly connected to the polishing filter inlet conduit, and further includes a polishing filter housing and a polishing filter cartridge disposed therein. The polishing filter is fluidly connected to a polishing filter outlet conduit.

In an embodiment, the polishing filter apparatus may further include a polishing filter conduit connected to the pump conduit, and a shutoff valve disposed on one of the pump conduit and polishing filter conduit. A filter housing conduit stub for connecting the polishing filter to the polishing filter barrier outlet conduit may further be provided. The polishing filter apparatus may still further include a power cord leading into the polishing filter barrier and connecting to the pump for supplying the pump with power. The polishing filter apparatus may also include a polishing filter barrier cover having a shutoff valve access hole for easy accessibility to a shutoff valve disposed on one of the pump conduit and polishing filter conduit. A polishing filter barrier cover having a power cord access hole for allowing a power cord to lead into the polishing filter barrier and connect to the pump for supplying the pump with power may be provided as well.

In another embodiment, the polishing filter cartridge contains a hydrophilic filtration media composition capable of removing synthetic ester-based fluids from the fluid, such that a surface energy of the hydrophilic composition is greater than or equal to 35 dynes per centimeter. The polishing filter cartridge filtration media composition may be polyether sulfone or glass fiber. In still a further embodiment, the polishing filter cartridge filtration media composition has a surface energy greater than or equal to 45 dynes per centimeter.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 8 is a table of surface energies for various materials;

FIG. 9 is a table of surface tensions for various liquids; and

DESCRIPTION OF THE EMBODIMENT(S)

In describing the embodiment(s) of the present invention, reference will be made herein to FIGS. 1-10 of the drawings in which like numerals refer to like features of the invention.

The present invention explores the relationship between surface energy, surface tension, and filtration media porosity in order to create a sump pump barrier system capable of filtering any type of oil (e.g. mineral oil, synthetic ester, natural ester, etc.) from a liquid emulsion. Surface energy is essentially the measurement of disruption of intermolecular forces on a particular surface, ranging in measurements from high (e.g., copper) to low (e.g., Teflon or Polytetrafluoroethylene). Generally, the higher the measured surface energy, the more hydrophilic the surface or substrate, while the lower the measured surface energy, the more hydrophobic the surface or substrate is. FIG. 8 depicts a tabular view of exemplary surface energy measurements compiled by Steven Label of Santa Fe Springs, California USA (accessible at: stevenlabel.com). Surface tension relates to the measured tension of the surface "film" or "layer" of a liquid caused by the inter-molecular force of the liquid particles and their tendency to shrink into a minimum surface area. FIG. 9 depicts a tabular view of reference data compiled by Diversified Enterprises of Claremont, New Hampshire, USA (accessible at: accudynetest.com), displaying exemplary surface tension measurements of various liquids with water having a notably high surface tension measurement when compared to the majority of the other liquids shown.

The relationship between surface tension and surface energy is important in establishing the levels of attraction/repulsion between the media and the fluid. The higher the measured surface tension, the stronger the intermolecular attractions (and amount of energy needed to separate said attractions). Generally, a fluid with a higher surface tension is less likely to wet a filtration media with a low surface energy. Thus, the surface energy of a filtration media is a necessary measurement in determining the retention factor against fluids with a high surface tension. At adequately small dimensions of the filter media (porosity), this force can be utilized to retain desired fluids by appropriate selection of media. Therefore, matching high surface tension fluids to high surface energy filter media will effect the desired separation of oil from water.

The development of the synthetic ester emulsion filters began with an observation made during an attempted filtration of what was assumed to be particulate impurities in effluent from a barrier test. The presumed particulate matter was theorized to be high molecular weight fractions (and thus high boiling) of the surfactant (Span 80) used in the graphene/graphite polymer composite disclosed in the '735 Patent. Upon filtration of the visible particulates, an unexpected result was observed that particulates were absent. Instead, the presence of oil was identified and confirmed, as shown by the prior art lab results of FIG. 1, which depicts a tabular view of laboratory results in which oil and grease in a water sample was tested using United States Environmental Protection Agency ("EPA") test method 1664A. Further investigation led to the realization that the oil present was an ester transformer fluid (Midel® oil). The Midel® oil, due to its combined characteristics of relatively polar nature and its density of nearly 1 g/mL, forms a very stable emulsion with water especially when passed through a high rpm sump pump. Essentially, the dissimilarity of the surface tension of synthetic ester/Midel® oil (comparative to water, which is approximately 73 dynes/cm; see FIG. 9) to water forms a filtration media capable of retaining oil while simultaneously allowing water to bypass in a manner that meets or exceeds EPA regulations. Through further experimentation, it was found that a hydrophilic media composition was required to achieve this Since the material being held back was oil and not particulates, it is more probable that the mode of retention is not exclusion by physical size but rather by some other physical or chemical parameter. It was determined that the filter used was of a certain polymer membrane (polyether sulfone), which is noted for its very hydrophilic nature and hence high flow rates in aqueous systems. It was then determined that the polyether sulfone membrane was able to retain the ester oil (Midel® oil) in any concentration, whether or not it was emulsified, while allowing water to flow. It, was further determined that other oils including standard transformer oils were similarly retained by this type of filter. Thus, the mode of separation was predicated on surface tension of the components relative to the surface energy of the membrane. The polyether sulfone membrane is very hydrophilic, having a relatively high surface energy—near that of water. This hydrophilic nature is what makes it very suitable for aqueous media. It is able to have relatively high flow rates compared to hydrophobic media at equivalent porosities.

Typically, challenges are presented where it is necessary to remove trace amounts of water from petroleum feedstock. Filter media that allows oil to pass but retains water is desirable; however, in such industries the opposite perspective has not been readily addressed in the same fashion—removing oil from a water feed. Moreover, the concept of the present invention of utilizing surface energy differentiation to drive separation of oil from water utilizing a hydrophilic filter media is unique to the art.

It has been determined that optimization of flow rate while maintaining oil retention is a necessary limitation. A limit was reached using polyether sulfone membrane filters wherein the available porosity of membranes is not able to economically achieve the flows required. Consequently, a new hydrophilic type of media was introduced into the system and tested. The new media, glass fiber, was very hydrophilic. It was able to perform as well as the polyether sulfone membrane in terms of oil retention and was more economically viable. It was also available in a wider range of porosities. Through various trials it was determined that a cartridge containing media at a porosity of between 0.2-20 µm was suitable for the pressures and flows of the barrier system that the filter supports.

Filtration media has become highly specialized for various purposes. Among the critical parameters in filtration is the relative hydrophilicity, or conversely hydrophobicity, of the media. Filters with highly hydrophilic media have been developed specifically to allow for greater flow (throughput) of aqueous solution at a given porosity. The physical parameter of surface energy, which is a property inherent to any given material, determines the relative hydrophilicity of a given media. Exemplary surface energy measurements of various compositions are provided in FIG. 8, and the relative surface tensions of various liquids are shown in FIG. 9. Materials with relatively high surface energy (e.g., copper) allow for greater water flow as water itself has a high surface tension (relative to most liquids; see FIG. 9). Materials of very low surface energy (e.g., Polytetrafluoroethylene; more commonly known as Teflon) will allow high flow of many organic liquids but will greatly resist the flow of aqueous solutions without being put through a process known as pre-wetting. Such materials (hydrophobic, low surface energy) are also susceptible to filter blinding (i.e., having the filtering fluid being unable to interact with the filter media) via de-wetting.

The present invention demonstrates how the effect of surface energy (in conjunction with appropriate porosity) can be used in a filtration system to separate effectively oils (typically having a very low surface tension) from water. The interplay between surface energy and porosity is selected and utilized to determine the ability of a filter to perform this task. Empirical evidence has demonstrated that the higher the surface energy of the filter media, the larger the pores can be and still successfully retain oil. Conversely, lower surface energy materials require smaller pore size in order to be effective. At a point, as the surface energy becomes lower, a filter may no longer be able to hold back the oil at all. Continuing the trend of decreasing surface energy relative to the fluid being filtered, it will Be possible to have the low surface tension liquid pass while retaining the water from such a mixture (these are considered hydrophobic filters).

A sump pump system 100 comprising a sump pump barrier 10 and a polishing filter apparatus 30, inclusive of a polishing filter barrier 20 with a polishing filter 32 disposed therein is provided. Sump pump barrier 10, as previously described above, comprises an outlet conduit 12 and a connecting fitting 14 for securing the connection between sump pump barrier 10 and polishing filter 32, which upon assembly is enclosed in polishing filter barrier 20, and forming polishing filter apparatus 30, as shown in FIGS. 2-6.

Figure 3:
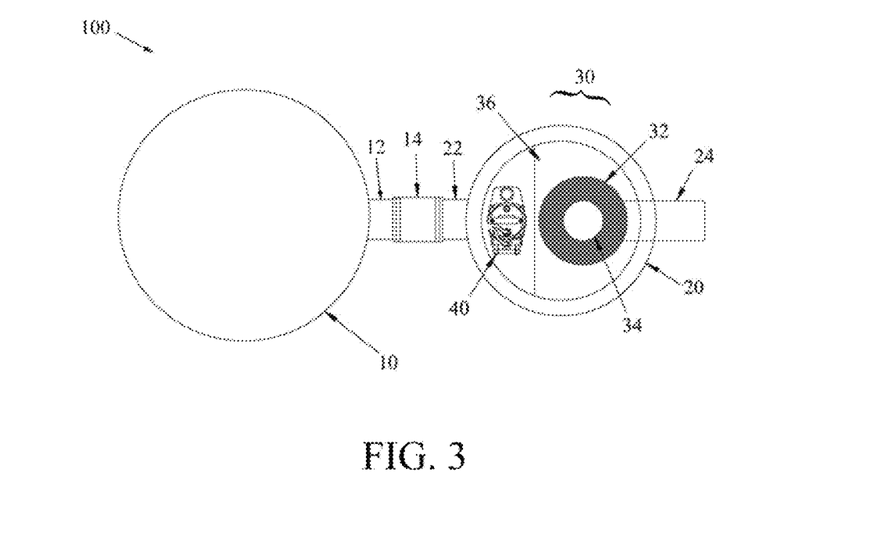
FIG. 3 is a top down, partially cross-sectional view of the sump pump system of FIG. 2.

As depicted in FIG. 3, polishing filter inlet conduit 22 leads at one end into the polishing filter 32 and connects to the sump pump outlet conduit 12 via the connecting fitting 14 at the other end. Polishing filter barrier 20 is in mechanical communication with the polishing filter inlet conduit 22, an outlet conduit 24, and a barrier cover 26 for disposal over the top surface of the polishing filter barrier 20. Disposed within the polishing filter barrier 20 is a pump 40, from which leads a pump conduit 42 therefrom and connects to a polishing filter conduit 31 via a union fitting 44, or by any other acceptable fluid-tight connections. A shutoff valve 46 may be disposed anywhere along the polishing filter conduit 31 or pump conduit 42, the shutoff valve being interactive to open/close the flow of fluids through said conduits 31, 42. Shutoff valve 42 may be accessible to an end user through the polishing barrier cover 26, such as via a shutoff valve access hole 27 carved into the barrier cover 26. An optional power cord 28 leads from the outside of the polishing filter barrier 20 into the barrier via a power cord access hole 29 accessible through the polishing barrier cover 26, and connects to the pump 40 to supply power.

Polishing filter conduit 31 leads into a polishing filter 30, which is also disposed within the polishing filter barrier 20. The polishing filter apparatus 30 comprises the polishing filter 32 having a polishing filter cartridge 34 disposed therein. The polishing filter cartridge 34 may contain a media comprising poly ether sulfone, glass fiber, or any other hydrophilic media capable of retaining/capturing/removing synthetic ester-based fluids. Alternatively, in at least one preferred embodiment, any filter media having a surface energy greater than or equal to 30 mJ/square meter may be used within the polishing filter cartridge 34. In another preferred embodiment, the filter media surface energy is greater than or equal to 45 mJ/square meter. A filter housing support 36 is disposed on the top surface of the polishing filter apparatus 30 from which the polishing filter conduit 31 is connected, and the polishing filter 32 is suspended within the polishing filter barrier 20. A filter housing conduit stub 38 extends from the bottom edge of the filter housing 32, which leads into the outlet conduit 24. Conduit stub 38 is further secured to the outlet conduit 24 via a conduit stub fitting 39.

Figure 4:
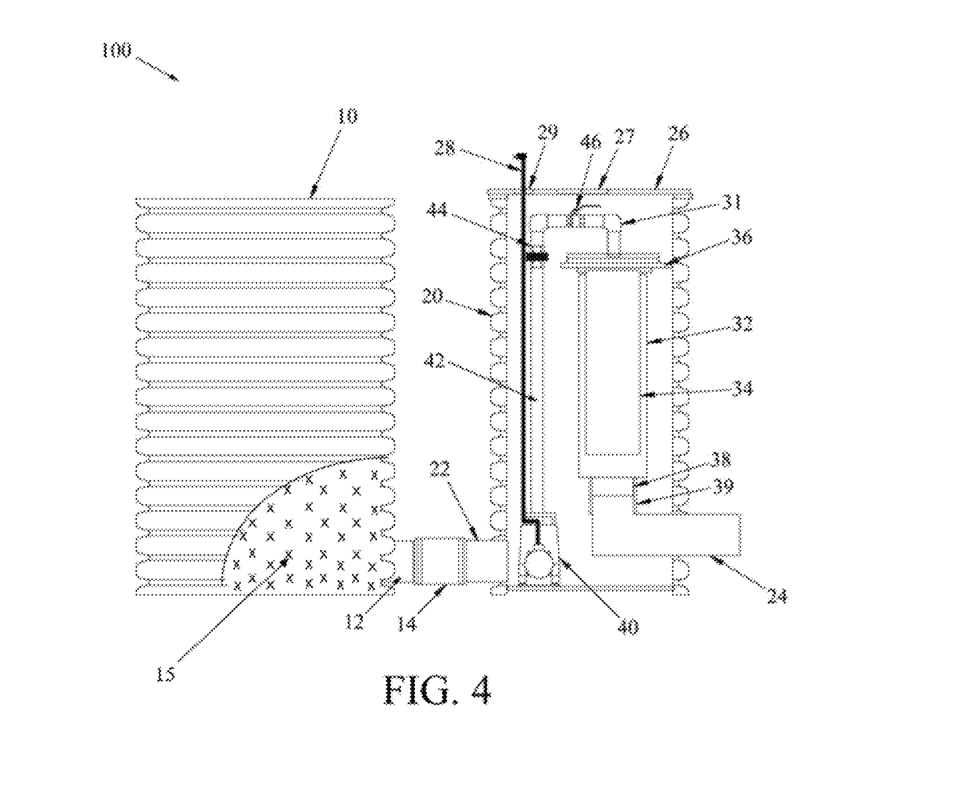
FIG. 4 is a side cross-sectional, partial transparent view of the sump pump system of FIG. 2.
Figure 5:
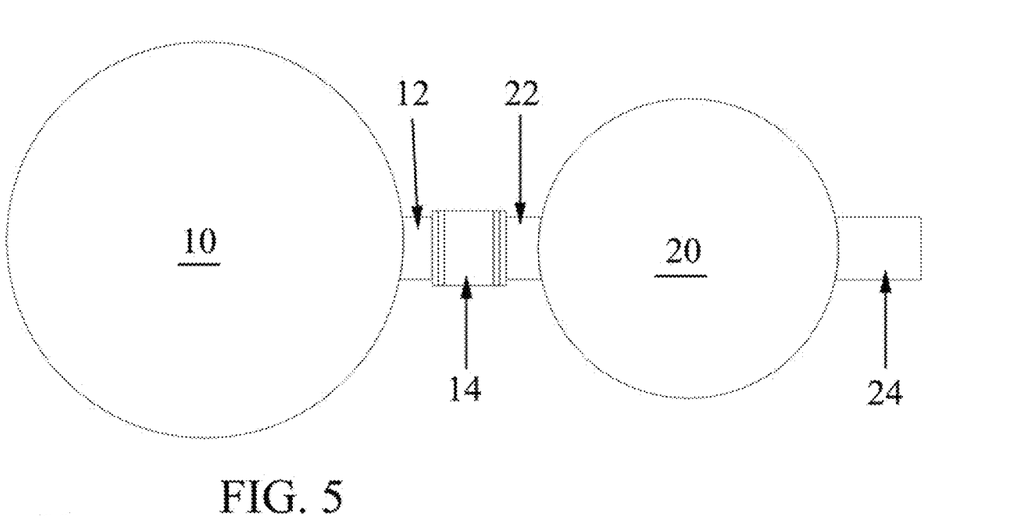
FIG. 5 is a top down view of the sump pump system of FIG. 2.
Figure 6:
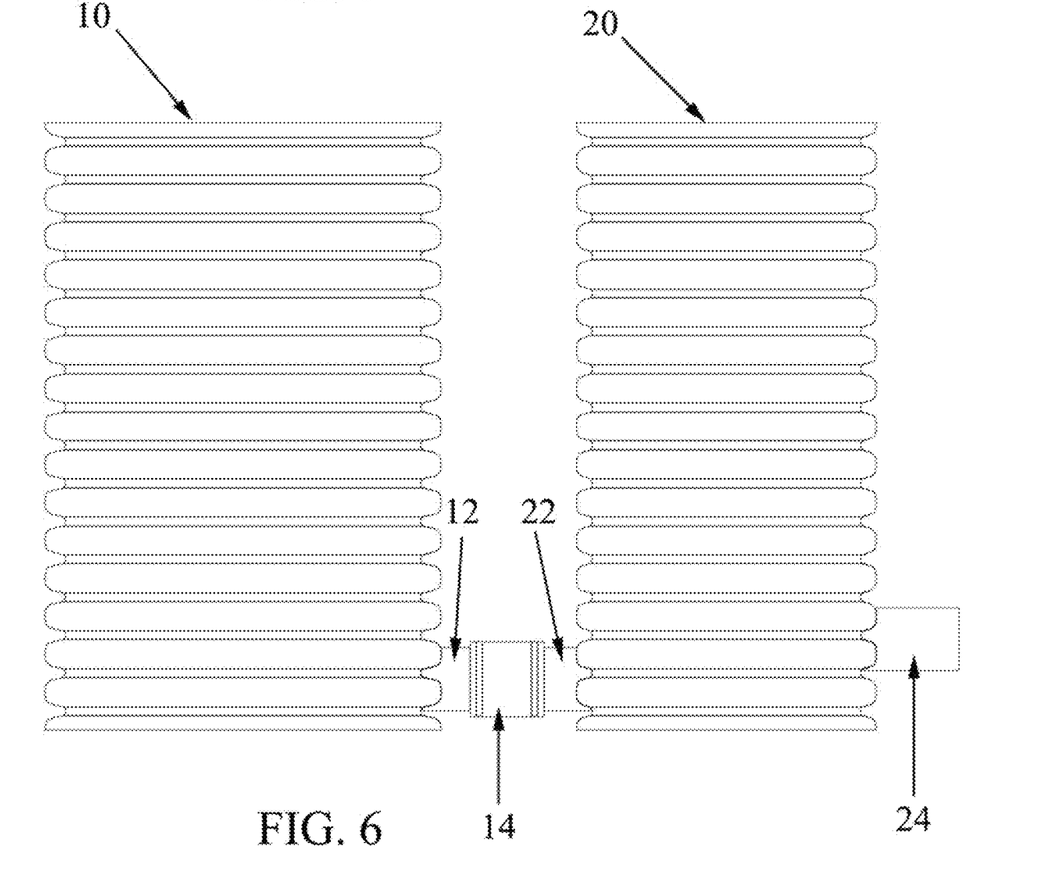
FIG. 6 is a side elevational view of the sump pump system of FIG. 2.

When a water and synthetic ester emulsion is pumped through the initial sump pump barrier 10, the majority of the synthetic ester is filtered out from the emulsion and absorbed by the filter media 15 disposed within the sump pump barrier. FIG. 4 is a side cross-sectional, partial transparent view of the sump pump system. However, given the problems with proper filtration of synthetic ester-based fluids as described above, some of this synthetic ester remains emulsified and egresses from the sump pump barrier 10 with the flowing water. This egressing water (still containing trace amounts of synthetic ester) will immediately enter the polishing filter barrier 20 of the present invention via the connection between the sump pump outlet pipe 12 and polishing filter barrier inlet pipe 22, and will begin to build up within the polishing filter barrier 20. The egressed water is then pumped upwards via the pump 40 through the pump piping 42, further through the polishing filter piping 31, and into the polishing filter 30. The egressed water is then filtered of any trace amounts of synthetic ester, to which the now purified water exits the polishing filter barrier 20 through the outlet pipe 24. Any overflow of emulsified fluids within the polishing filter barrier 20 may be addressed by activating the shutoff valve 46 to halt further flow of fluid.

Figure 7:
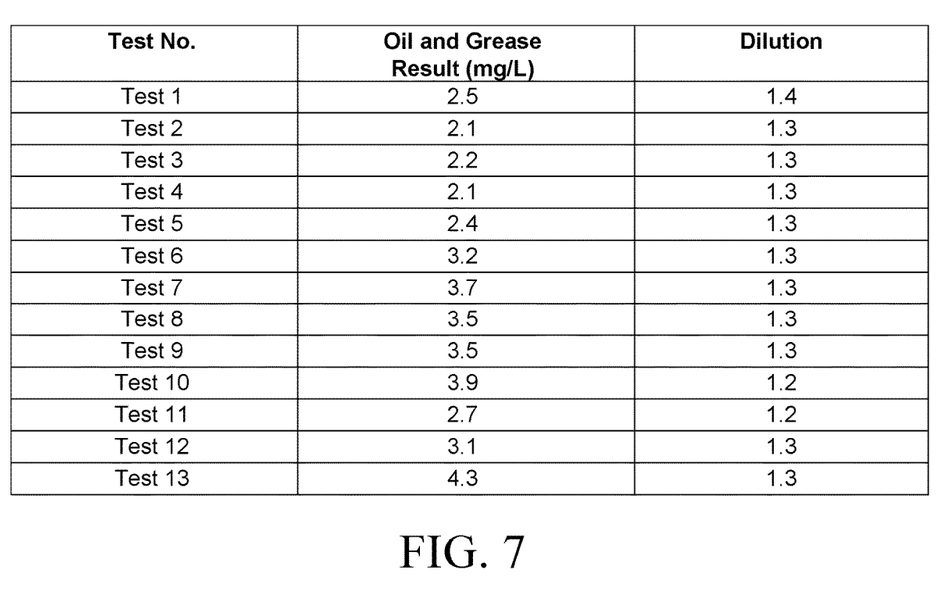
FIG. 7 is a table of laboratory results showing a consistent measurement of 5 parts per million or less of synthetic ester-based fluid in a tested post-filtered water; the tested water being filtered with the sump pump system of the present invention.
Figure 10:
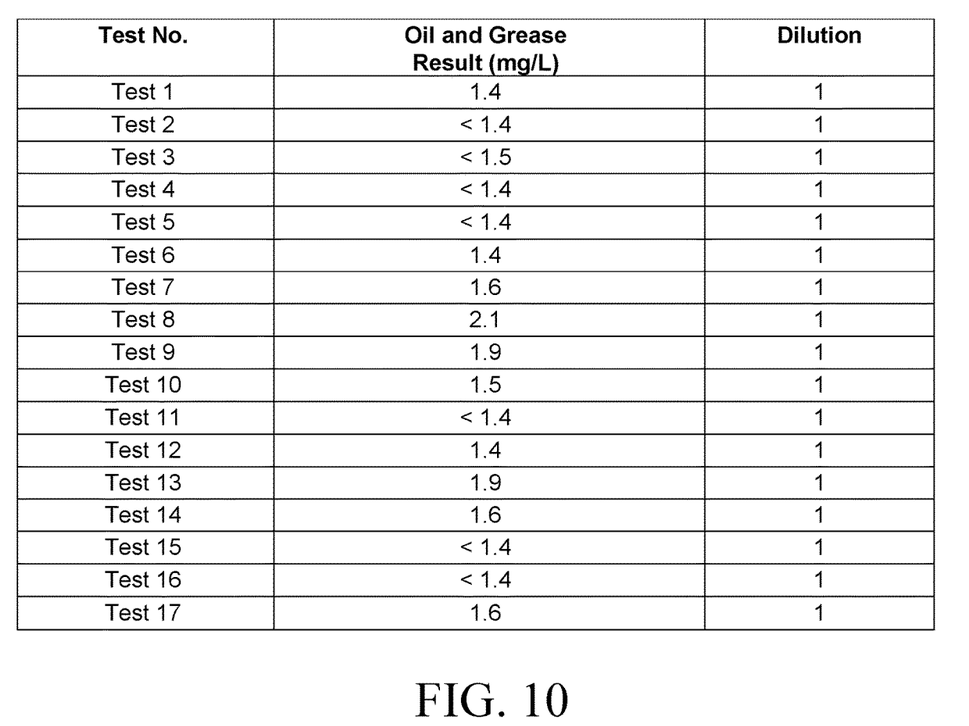
FIG. 10 is a table with test data samples demonstrating the efficiency of the current invention in the filtration of oils and synthetic esters from an emulsion at consistent measurements below 2 ppm.

The EPA requires the discharge of water containing oil (including natural ester-based and synthetic ester-based fluids) from power plants to be below 15 parts per million ("ppm"). Many United States territories have more stringent requirements, and Canadian, European, and Australasian regions can have even stricter requirements. FIGS. 7 and 10 depict tabular views of laboratory results using the same test method conducted in FIG. 1 (EPA test method 1664A). The sump pump system 100 of the present invention has proven to be consistently successful in achieving measured values of 5 ppm or less across thirteen (13) separate laboratory tests as shown in FIG. 7, and more recently to maintain consistent measured values of less than 2 ppm as exemplified in the laboratory test data shown in FIG. 10—far below the required threshold of 15 ppm as set by the EPA.

FIGS. 7 and 10 demonstrate that the Pump-Thru-Barrier ("PTB") has been tested with synthetic ester fluid for use as an effective oil containment method. Synthetic ester fluid has the appearance of oil but is a different composition from regular mineral oil and other hydrocarbon oils and fuels. Synthetic ester has become a better alternative for certain electric utility companies due to a much higher flash point relative to a reduced potential of explosions and fire.

The method of the present invention was developed for preventing synthetic ester discharge from containment areas in the event of a large oil spill from a failed transformer or from tanks and equipment filled with synthetic ester. In these applications, products for passive water drainage and absorption/solidification of synthetic ester achieve stoppage of synthetic ester to a point lower than 5 ppm in a water/rain discharge. Even straight (i.e., non-emulsified) synthetic ester oil spills may be stopped in such scenarios. The PTB on its own can stop all flow after the synthetic ester is absorbed in the media as described in the '735 Patent previously referenced herein, but cannot meet the discharge levels required without further treatment, such as the introduction and implementation of a polishing filter of the present invention.

The present invention thus uses the Solidification Products' PTB in environments subject to rain events where a synthetic ester spill could occur, and further utilizes a pump to carry the water/synthetic ester emulsion to the PTB. In these conditions, the emulsion is blended into a milky solution at up to 30 gpm, which then filters through the PTB media canister. The discharge water from this method had been laboratory tested through multiple tests and the measured ppm of synthetic ester in the water was deemed unsatisfactory, as demonstrated in FIG. 1. Samples taken directly from the discharge held ppm levels up to 65 ppm, depending on what stage of testing the samples were taken.

It was determined the polishing filter 32 of the present invention was required to achieve consistently low ppm levels (below 5 ppm). The discharge water from the PTB drains into the polishing filter barrier 20 where the pump 40 is disposed. The pump 40 includes a diaphragm switch, which for example is capable of turning on the pump at a 4"-6" fluid level and shutting off the pump at a 1"-2" fluid level. The water is pumped from within the polishing filter barrier 20 into the polishing filter 32. Here, the water is then restricted to an optimum flow rate, such as 12 gpm, and pumped into the polishing filter. The polishing filter 32 for the new filter cartridge 34 and corresponding media was designed and built to incorporate everything within the polishing filter apparatus, which also contains the pump, conduit system, and preferably a ball valve to pump directly into the polishing filter.

It has been determined that the matching of surface energy of the filter media to the surface tension of the fluid being filtered with the current system is such that it is able to force a phase from a highly emulsified oil/water mixture and allow the water to pass while retaining the oil. Throughout this filtration process, the emulsion remains stable due to the relative density and polarity of the synthetic ester oil as compared to water.

Thus, the present invention provides one or more of the following advantages: 1) a sump pump system for the filtration of synthetic ester-based fluid from an emulsion; 2) a method for removing synthetic ester-based fluid from an emulsion; 3) an apparatus for the effective removal of synthetic ester-based fluid from an emulsion; and 4) a new permutation/formulation of media effective against all oils, including mineral, natural, and/or synthetic esters.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A sump pump system for filtration of synthetic ester-based fluids from an emulsion, comprising:
   a sump pump barrier having an outlet conduit for flow of fluid therethrough, the sump pump barrier comprising:
      a housing; and
         including a filter media housing containing hydrocarbon absorption media;
   a polishing filter apparatus including a polishing filter disposed in a polishing filter housing, the polishing filter apparatus having:
      an inlet conduit and outlet conduit, the polishing filter inlet conduit fluidly connected to the sump pump barrier outlet conduit for the ingress of the fluid from the sump pump barrier into the polishing filter apparatus, the polishing filter outlet conduit for the egress of resultant filtered fluid; and
   said polishing filter in fluid communication with the polishing filter inlet conduit, the polishing filter having:
      a polishing filter cartridge disposed therein, the polishing filter cartridge containing a hydrophilic composition for the removal of synthetic ester-based fluid having a surface tension dissimilar to water, the hydrophilic composition having a surface energy greater than or equal to 35 dynes per centimeter, the hydrophilic composition having a porosity of about 0.2 μm to about 20 μm;
   wherein fluid flows through the sump pump barrier and into the polishing filter housing via the sump pump barrier outlet conduit and polishing filter inlet conduit, and into the polishing filter, and is then filtered via the polishing filter cartridge within the polishing filter housing;
   wherein resultant filtered fluid exiting the polishing filter housing via the polishing filter outlet conduit contains less than 5 ppm of said synthetic ester-based fluids.

2. The sump pump system of claim 1 wherein a filter media composition contained within the polishing filter cartridge includes polyether sulfone or a glass fiber media.

3. The sump pump system of claim 1 wherein the composition contained within the filter cartridge is a filter media having a surface energy greater than or equal to 45 dynes per centimeter.

4. The sump pump system of claim 1 further including a shutoff valve disposed on one of the sump pump barrier outlet conduit and polishing filter conduit, the shutoff valve being interactive to open/close fluid flow through said sump pump barrier outlet conduit and polishing filter conduit.

5. The sump pump system of claim 1 further including a polishing filter cover for disposal over a top surface of the polishing filter housing.

6. The sump pump system of claim 5 further including a shutoff valve access hole carved into the polishing filter cover for providing access to a shutoff valve disposed within the polishing filter housing and disposed on one of the sump pump barrier outlet conduit and polishing filter inlet conduit.

7. The sump pump system of claim 1 further including a pump disposed within the polishing filter apparatus and connected to a pump conduit, the pump conduit in fluid communication with an inlet of said polishing filter.

8. The sump pump system of claim 7 further including a power cord access hole carved into a polishing filter cover for allowing a power cord to lead into the polishing filter housing and connect to the pump, supplying the pump with power.

9. The sump pump system of claim 1, wherein fluid flowing through the sump pump barrier and into the polishing filter housing is restricted to a flow rate of about 12 gpm.

* * * * *